(12) United States Patent
Lillis et al.

(10) Patent No.: US 8,644,997 B2
(45) Date of Patent: Feb. 4, 2014

(54) LOAD SHARING ARCHITECTURE FOR REDUNDANT CHANNEL CONTROLLERS

(75) Inventors: Mark Lillis, South Windsor, CT (US); Walter S. Hojnowski, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 934 days.

(21) Appl. No.: 12/777,002

(22) Filed: May 10, 2010

(65) Prior Publication Data
US 2011/0276190 A1 Nov. 10, 2011

(51) Int. Cl.
*G05D 11/00* (2006.01)
(52) U.S. Cl.
USPC .............................. 700/295; 711/114; 713/300
(58) Field of Classification Search
USPC .............................. 700/295; 711/114; 713/300
See application file for complete search history.

(56) References Cited

U.S. PATENT DOCUMENTS

| | | | |
|---|---|---|---|
| 6,856,045 B1 | 2/2005 | Beneditz et al. | |
| 2003/0051098 A1* | 3/2003 | Brant et al. | 711/114 |
| 2003/0101712 A1* | 6/2003 | Johnson et al. | 60/226.2 |
| 2007/0050644 A1* | 3/2007 | Merkin | 713/300 |
| 2008/0253085 A1* | 10/2008 | Soffer | 361/687 |
| 2010/0302754 A1* | 12/2010 | Nordin et al. | 361/810 |

* cited by examiner

*Primary Examiner* — Mohammad Ali
*Assistant Examiner* — Anthony Whittington
(74) *Attorney, Agent, or Firm* — Kinney & Lange, P.A.

(57) ABSTRACT

A redundant, multi-source architecture provides output loads access to each of the plurality of power sources. The architecture includes at a least a first power bus and a second power bus. A plurality of loads are connected to the first power bus and the second power bus. Redundant first and second channel controllers are connected to receive power from the first power bus and the second power bus, respectively, wherein one of the first and second channel controllers is designated as the active channel controller. The active channel controller allocates power from both the first power bus and the second power bus to each of the plurality of loads.

9 Claims, 3 Drawing Sheets

LOAD SHARING ARCHITECTURE FOR REDUNDANT CHANNEL CONTROLLERS

BACKGROUND

The present invention relates to a power distribution system, and in particular to a redundant power distribution system.

Typically vehicles, such as an aircraft, utilize a power distribution assembly (PDA) to distribute power to various aircraft systems. Traditionally, a PDA includes an active channel controller associated with a first power bus and a standby or back-up channel controller with a second power bus. A single arbitration card provides a communication interface for both the active and back-up channel controllers. A common data bus is connected to each of the power modules and interfaces with the arbitration card. When healthy, the active channel controller provides power from the first power bus to the plurality of power modules or loads, while the back-up channel controller remains in a stand-by mode, providing no power from the second power bus to the loads. In the event the first channel controller fails, or the first power bus becomes unhealthy, the arbitration card switches control from the active channel controller to the back-up channel controller, which distributes power from the second power bus to the plurality of loads.

In this way, the traditional redundant architecture provides the requisite reliability for critical systems. However, this architecture requires that each power bus be capable of handling loading requirements for all attached loads. As such, circuit breakers or other protective devices associated with both the first and second power buses must be sized to handle the full loading requirements of each of the plurality of loads. The combined power rating of the circuit breakers is therefore underutilized during normal operation in which both or all power buses are healthy.

SUMMARY

A redundant, load-sharing architecture provides output loads access to each of the plurality of power buses. The architecture includes at a least a first power bus and a second power bus. A plurality of loads is each connected to the first power bus and the second power bus. Redundant first and second channel controllers are connected to receive power from the first power bus and the second power bus, respectively, wherein one of the first and second channel controllers is designated as the active channel controller. The active channel controller allocates power from both the first power bus and the second power bus to each of the plurality of loads.

DETAILED DESCRIPTION

The present invention provides a redundant, load-sharing architecture that provides output loads access to each of the plurality of power buses. Redundant power buses are provided to each of the plurality of loads, and redundant channel controllers dictate the power bus from which each of the plurality of loads draws power, allowing a first load to draw power from a first power bus while a second load draws power from a second power bus. The present invention therefore provides the desired redundancy while utilizing the full power capacity of the two or more available power buses.

Figure 1:
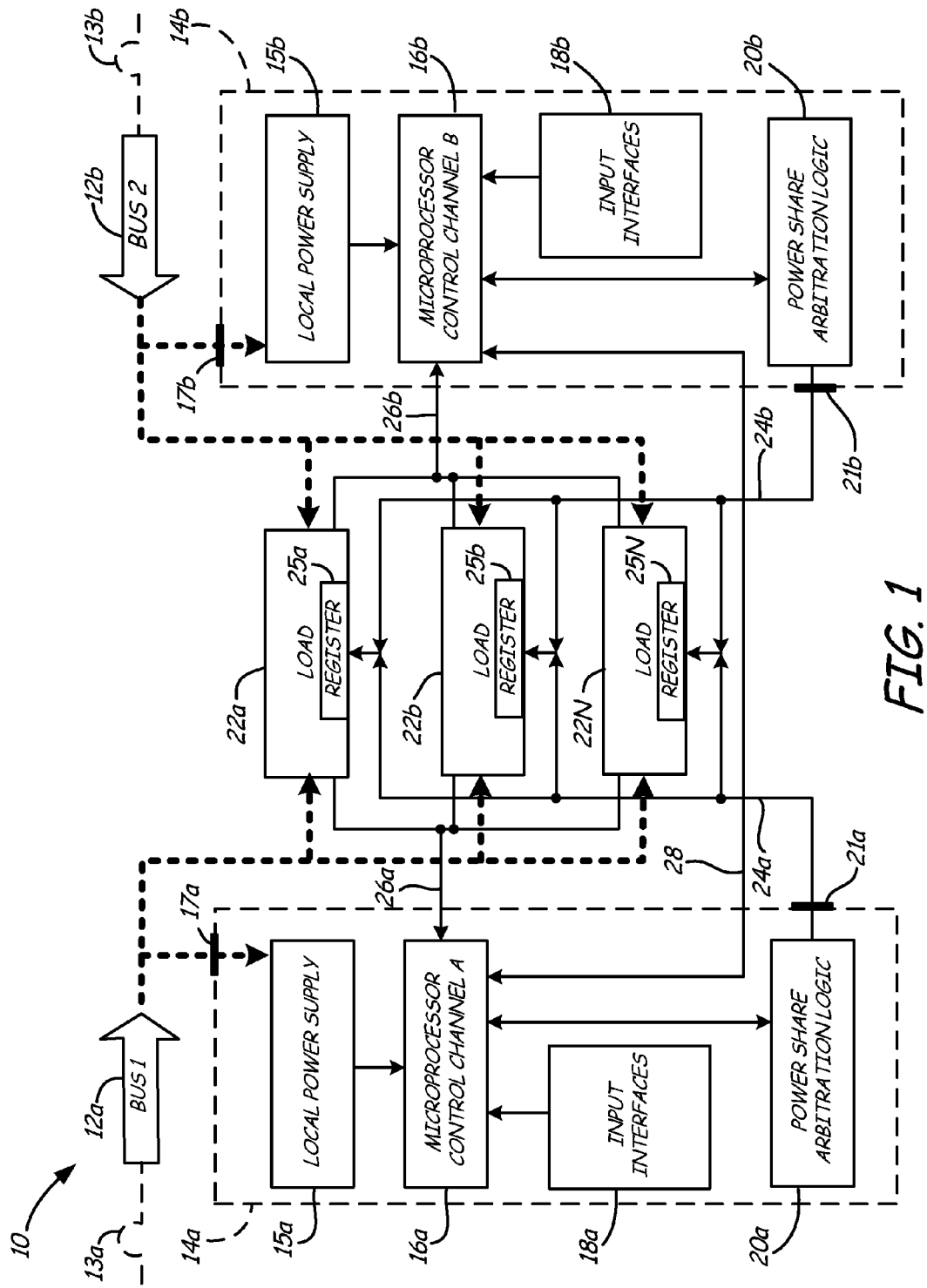
FIG. 1 is a block diagram illustrating a redundant, load-sharing system according to an embodiment of the present invention.

FIG. 1 is a block diagram illustrating a redundant, load-sharing system 10 according to an embodiment of the present invention. System 10 includes power buses 12a and 12b, protective circuits 13a and 13b (e.g., circuit breakers), channel controllers 14a and 14b, and loads 22a, 22b . . . 22N. Channel controller 14a includes local power supply 15a, microprocessor 16a, power input terminal 17a, input interface 18a, power share arbitration logic 20a, and communication output terminal 21a. Redundant channel controller 14b likewise includes local power supply 15b, microprocessor 16b, power input terminal 17b, input interface 18b, power share arbitration logic 20b, and communication output terminal 21b.

First power bus 12a and second power bus 12b are connected to provide power to connected loads 22a-22N as well as operational power to channel controllers 14a and 14b via local power supplies 15a and 15b. Input interfaces 18a and 18b provide instructions to microprocessors 16a and 16b, respectively, regarding the desired operation of the loads (i.e., which loads 22a-22N to turn On and Off, etc.). In traditional redundant power bus systems, connected loads draw power from only one of the available power buses. The remaining power bus remains un-utilized unless the primary power bus fails. This all-or-nothing approach requires protective circuits 13a and 13b to be sized to handle the total power requirements of all connected loads. In the present invention, the active channel controller (either channel controller 14a or 14b) acts to selectively allocate power from both first power bus 12a and second power bus 12b. Therefore, during normal operation the redundant, load-sharing system 10 is able to utilize power available on both first power bus 12a and second power bus 12b. In the event of a failure on one of the available power buses 12a, 12b, the active channel controller 14a or 14b re-allocates the distribution of power from the operational power bus 12a or 12b to the loads 22a-22N such that the load requirements do not exceed the individual rating of the protective circuits 13a or 13b associated with the operational power bus 12a or 12b. The redundant, load-sharing system 10 therefore provides the desired redundancy while utilizing the full capacity of the available power buses 12a, 12b.

In the embodiment shown in FIG. 1, load control and power allocation is provided by either channel controller 14a or channel controller 14b, depending on which channel controller is designated as the active channel controller. For example, if both channel controllers 14a, 14b are operating normally, channel controller 14a interacts with each of the connected loads 22a-22N as the active channel controller while channel controller 14b remains in a standby mode. In the event channel controller 14a becomes inoperable, then channel controller 14b is designated as the active channel controller and interacts with each of the connected loads 22a-22N. The designated active channel control receives inputs from connected loads 22a-22N related to the operational states of the connected loads 22a-22N (e.g., temperature, position, etc.) and provides control instructions via communication buses 26a and 26b, respectively, to each of the plurality of loads 22a-22N. While inputs from the loads are provided redundantly to both microprocessors 16a or 16b, only the microprocessor associated with the active channel controller will respond to the inputs received from the connected loads 22a-22N. In this way, first and second channel controllers 14a and 14b are redundant to one another. If one of the channel controllers 14a or 14b should happen to fail, the other channel controller is available to step into the active channel controller role.

In addition to controlling the performance of each load 22a-22N, redundant channel controllers 14a and 14b provide load sharing by controlling from which power bus 12a, 12b each connected load 22a-22N draws power. Load sharing instructions are provided at output terminals 21a or 21b of the active redundant channel controller 14a or 14b, respectively, and communicated via communication buses 24a and 24b, respectively to load setting registers 25a-25N. Each of the plurality of loads 22a-22N are each connected to both first power bus 12a and second power bus 12b, and based on load sharing instructions stored by load setting registers 25a-25N selectively draw power from either the first power bus 12a or the second power bus 12b. In this way, the active channel controller may direct loads to draw power from either first power bus 12a or second power bus 12b. For example, if first channel controller 14a is operating as the active channel controller, first channel controller 14a may provide load allocation instructions (via communication output terminals 21a) instructing some of loads 22a-22N to draw power from first power bus 12a and some of loads 22a-22N to draw power from second power bus 12b, even though first channel controller 14a is not associated with second power bus 12b.

In the embodiment shown in FIG. 1, controllers 14a and 14b employ a combination of hardware and software to provide the desired load sharing. Power share arbitration logic 20a or 20b (depending on which channel controller is active) and software executed by microprocessor 16a or 16b, respectively, form a power allocation module that provides control instructions to each of the plurality of loads 22a-22N, dictating from which of power buses 12a, 12b each load draws power. In other embodiments (such as that shown in FIG. 2), the power allocation module may be implemented in software stored on a computer readable medium and executed by microprocessors 16a and 16b. Implementing load sharing in software increases flexibility in load allocation, while implementing load sharing in hardware provides faster response times and the ability to continue load sharing operations despite faults in either of channel controllers 14a or 14b. It should be understood that the power allocation module and functions implemented by the power allocation module could be implemented in hardware, software executed by a microprocessor, or a combination thereof. Communication buses 24a and 24b (as well as communication buses 26a, 26b and 28) may be implemented with any well-known communication bus standard, such as the ARINC 429 aircraft communication protocol bus, Ethernet, or Controller Area Network (CAN) buses.

In the embodiment provided in FIG. 1, loads 22a-22N may be organized into power groups. The division of loads 22a-22N into power groups may be based on the function performed by the load, the importance of the load, and/or the power drawn by the load. For example, highly important loads may be grouped into a first power group and power allocation will always be provided to this power group before others. It may also be beneficial to group loads 22a-22N by their expected power draws, such that the combined power drawn by a particular grouping does not exceed the individual rating protective circuits 13a, 13b associated with a power bus 12a, 12b.

The active channel controller makes a number of determinations regarding how power should be allocated from the plurality of power buses 12a, 12b to the connected loads 22a-22N, based on factors such as the ratings of protective circuits 13a and 13b and the various nominal, transient, and worst case power profiles of the connected loads 22a-22N. Allocating the distribution of power to ensure the individual ratings of protective circuits 13a and 13b are not exceeded allows the present invention to utilize the full capacity of each power bus 12a, 12b. For example, assume the individual rating of protective circuits 13a and 13b is ten amperes (10 amps) as a trip threshold, load 22a draws four amperes, load 22b draws eight amperes, and load 22N draws two amperes. Controller 14a may allocate power from power bus 12a to loads 22a and 22N for a total of six amperes drawn from power bus 12a, and allocate power from power bus 12b to load 22b, which draws eight amperes from power bus 12b. In this way, during normal operations (i.e., both power buses 12a, 12b healthy) connected loads 22a, 22b, 22N draw a combined fourteen amperes from power buses 12a and 12b without exceeding the individual ratings (10 amps) of either protective circuit 13a, 13b.

Information regarding the nominal, transient, and worst case scenarios of each load 22a-22N may also be incorporated into power allocation determinations. For example, in-rush currents associated with sharing a particular load (i.e., a temporary transient) may be employed by the active channel controller in allocating power to each of the plurality of loads 22a-22N. In another example, the active channel controller may temporarily re-allocate power from a low-priority load to a high-priority load to account for high current transients drawn by the high-priority load. Decisions by the active channel controller regarding transient load requirements may be based on communications received from other controllers regarding the transient load requirements, communications received from the loads themselves (via communication from buses 26a, 26b), or by monitoring events on the power buses 12a, 12b (i.e., changes in voltage, current, etc.).

Channel controllers 14a and 14b further include power input terminals 17a and 17b, respectively, for receiving power from and monitoring the status of power buses 12a and 12b, respectively. In one embodiment, local power supplies 15a and 15b include an analog-to-digital converter (ADC) that allows microprocessors 16a and 16b to monitor the status (i.e., voltage, current, etc.) associated with power buses 12a and 12b, respectively. Alternatively, ADCs can be incorporated in the microprocessors 16a, 16b. Each channel controller 14a, 14b, even when operating in stand-by mode, monitors the status of the associated power bus 12a, 12b and relays this information via communication bus 28 to the opposite channel controller. In this way, the active channel controller is aware of the status of each power bus 12a and 12b, even those power buses 12a, 12b with which it is not associated.

In the event that one of the power buses 12a, 12b becomes unavailable, the active channel controller modifies the power allocation from a full performance mode to a reduced performance mode. This may include re-allocating power from the remaining power buses to loads previously powered by the failed power bus, reducing the power allocated to non-essential loads, or time-multiplexing the allocation of power to each of the connected loads 22a-22N. Reducing the power allocated to non-essential loads may include removing power entirely from the non-essential loads or running the load at a reduced performance level that requires less total power. The state of each power bus 12a, 12b (e.g., stable, available) is monitored by the channel controller associated with the power bus. Therefore, channel controller 14b monitors the state of power bus 12b and communicates the status of power bus 12b to channel controller 14a via communication bus 28.

In addition, channel controllers 14a and 14b may monitor parameters such as load temperature and allocate power to the various loads 22a-22N to compensate for the temperatures of the load and its corresponding effects on the current drawn by the load. These parameters and/or other communications provided by loads 22a-22N are communicated via communication buses 26a, 26b. The state of each power bus (e.g., stable, available) is monitored by the channel controller associated with that power bus. Therefore, channel controller 14b monitors the state of power bus 12b and communicates the status of power bus 12b to channel controller 14a via communication buses 26a and 26b.

Figure 2:
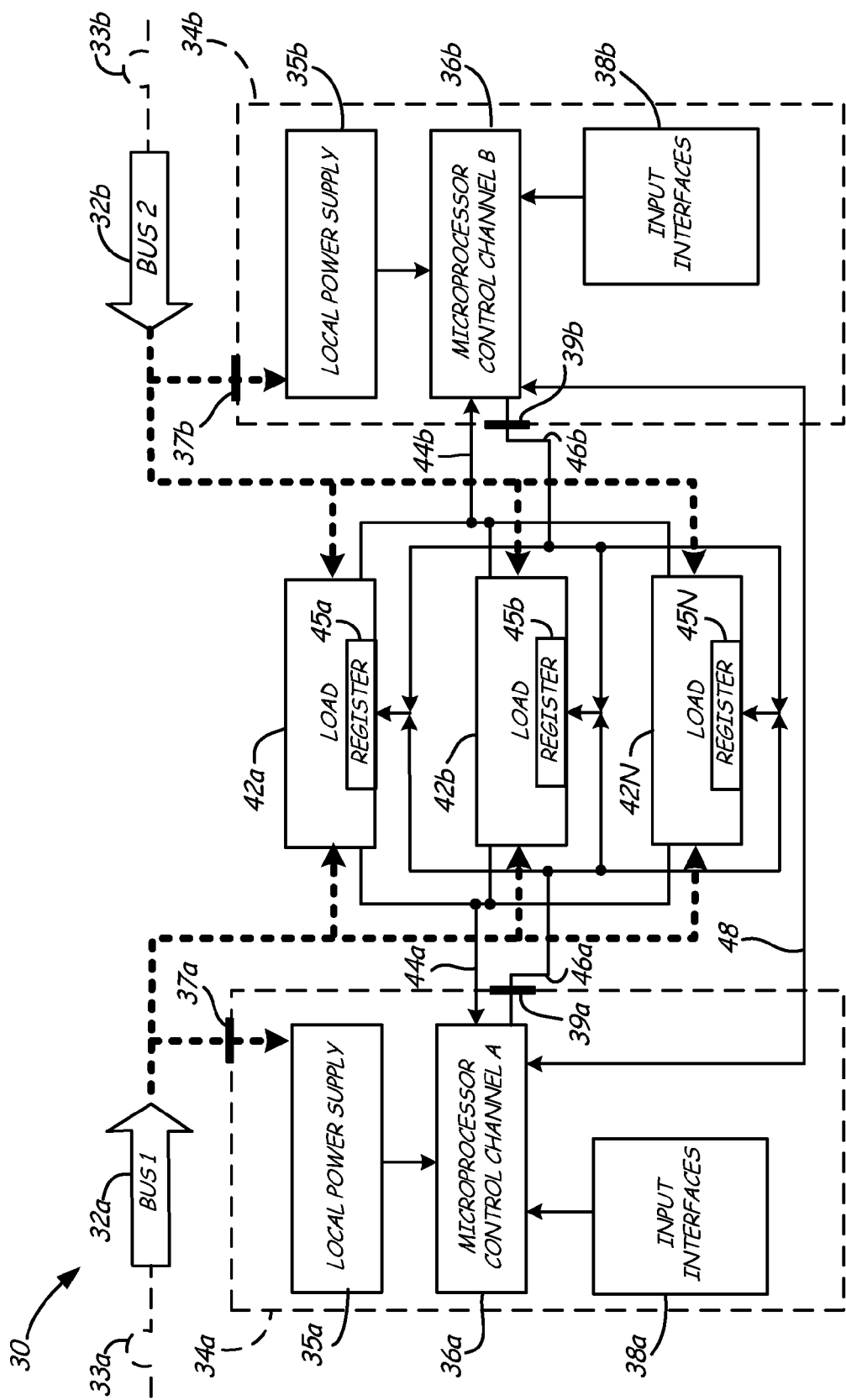
FIG. 2 is a block diagram illustrating a redundant, load-sharing system according to another embodiment of the present invention.

FIG. 2 is a block diagram illustrating a redundant, load-sharing power system 30 according to another embodiment of the present invention. System 30 includes power buses 32a and 32b, circuit breakers 33a and 33b, channel controllers 34a and 34b, and loads 42a, 42b . . . 42N. Channel controller 34a includes local power supply 35a, microprocessor 36a, power input terminal 37a, input interface 38a, and communication output terminal 39a. Redundant channel controller 34b includes local power supply 35b, microprocessor 36b, power input terminal 37b, input interface 38b, and communication output terminal 39b.

Figure 3:
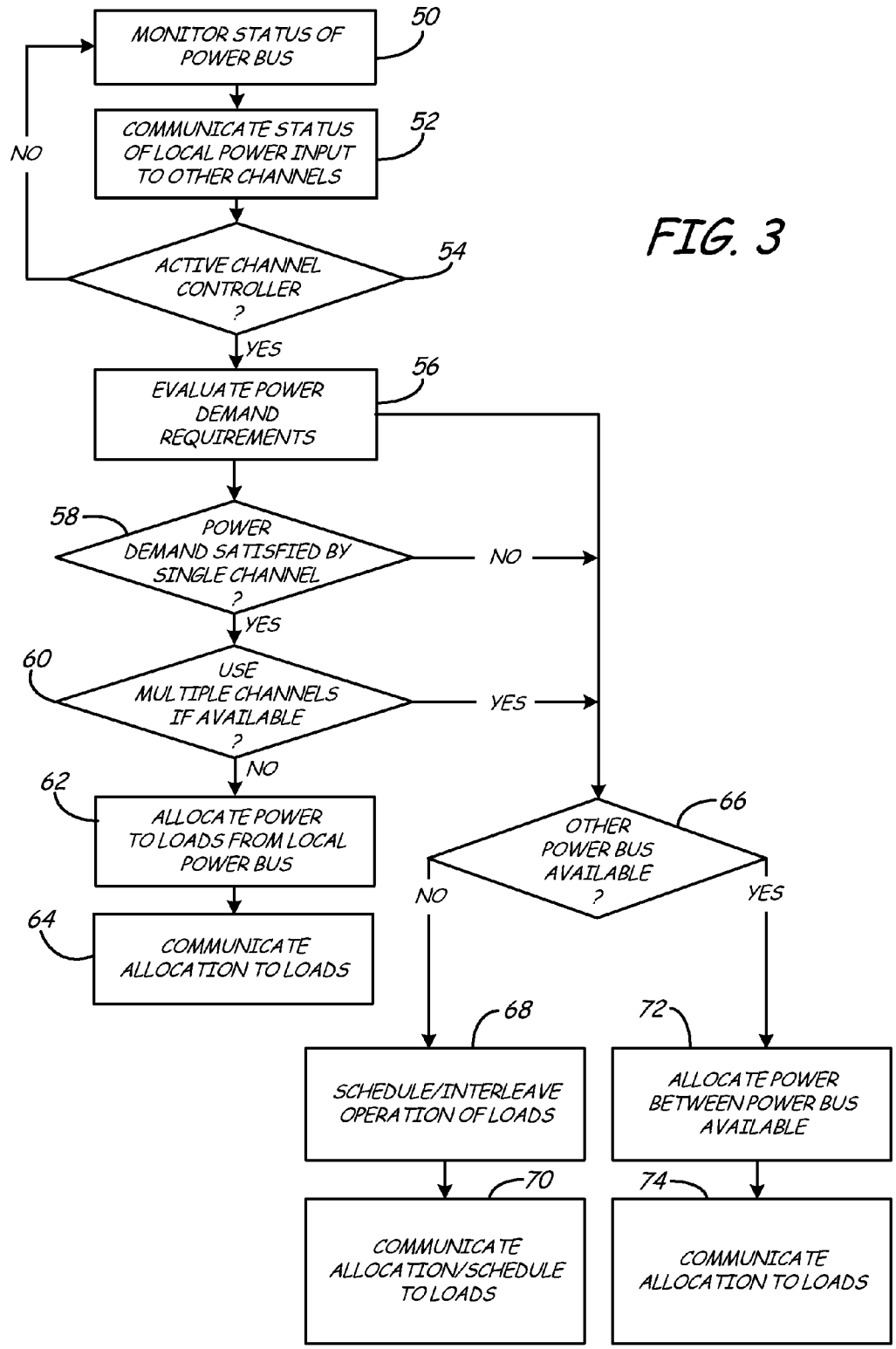
FIG. 3 is a flowchart illustrating steps performed by a channel controller employed in a redundant, load-sharing system according to an embodiment of the present invention.

In the embodiment provided in FIG. 2, the power allocation module is implemented by software executed by microprocessor 36a and 36b. Each microprocessor 36a and 36b is connected to communicate load allocation instructions to the plurality of loads 42a-42N via communication output terminals 39a and 39b. Load allocation instructions are provided via communication bus 46a or 46b (depending on which channel controller is active) to load setting registers 45a-45N. Microprocessors 36a and 36b likewise communicate status information to one another via communication bus 48. Status information may include the status (e.g., available, health) of the power bus associated with each microprocessor. The microprocessor associated with the active channel controller executes software algorithms to make power allocation decisions based on the power capacity of available power buses 32a, 32b and power requirements associated with each of the plurality of loads 42a-42N. As described with respect to FIG. 1, power allocation determinations may be based on the individual ratings of the circuit breakers as well as other nominal, transient, and worst case power profiles of the connected loads. Power allocation determinations are communicated by the microprocessor associated with the active channel controller via output terminals 39a and 39b. Communication buses 44a and 44b provide the power allocation communications to load setting registers 45a-45N, which dictate the power bus 12a, 12b from which each load 22a-22N draws power FIG. 3 is a flowchart illustrating operations performed by either the first channel controller or the second channel controller according to an embodiment of the present invention. In this example, the embodiment shown in FIG. 1 is used, and it is assumed that first channel controller 14a is operating as the active channel controller and second channel controller 14b is acting as the non-active or redundant controller. Operations performed by the embodiments shown in FIG. 2 will be similar.

At step 50, first channel controller 14a monitors the status of power bus 12a. This may include monitoring the voltage, current or combination thereof associated with power bus 12a to make determinations regarding the status and/or health of the power bus 12a. For example, first channel controller 14a may monitor the voltage provided by the power bus 12a with respect to a threshold value to ensure the voltage provided is sufficient for supply to the attached loads 22a-22N. In other embodiments, first channel controller 14a determines the source (e.g., battery, generator, etc.) of power provided on the power bus 12a based on voltage characteristics such as magnitude, frequency, etc.

At step 52, first channel controller 14a communicates the state of power bus 12a to second channel controller 14b, as well as to any other redundant channel controllers. For example, as shown in FIG. 1, channel controller 14a communicates via communication bus 28 to channel controller 14b the state of power bus 12a. Likewise, channel controller 14b communicates via communication bus 28 the state of power bus 12b to channel controller 14a. In this way, both channel controllers 14a, 14b are aware of the state or condition of both power buses 12a, 12b.

At step 54, the active channel controller is determined. This determination may be pre-determined by hardware/software selections, or may be dynamically determined based on the status of power buses communicated between the controllers. For example, if one of the power buses 12a, 12b is determined to be unstable or unsatisfactory, then it may be desirable to rest control of the power allocation in the channel controller associated with the stable power bus. The non-active channel controller returns to step 50 and continues monitoring and communicating the status of the power bus with which it is associated without controlling the distribution of power to the attached loads 22a-22N.

At step 56, the active channel controller (channel controller 14a in this example) evaluates power demand requirements based on the loads to be operated. In the embodiment provided in FIG. 1, input interfaces 18a and 18b communicate instructions regarding load operation to microprocessors 16a and 16b, respectively. For example, the provided instructions may dictate which loads 22a-22N are to be On and Off, the duration of operation of each load, etc. The instructions provided by input interfaces 18a and 18b are redundant, and although they are provided to both channel controllers 14a, 14b, only the channel controller associated with the active channel controller will respond to the instructions provided. The channel controller associated with the non-active channel controller may store the instructions provided, but will not respond to the instructions provided.

In addition, the instructions provided by input interfaces 18a and 18b will vary based on changes in operating conditions, or set-points associated with the plurality of loads 22a-22N. The channel controller associated with the active channel is therefore continually monitoring for instructions received from input interfaces 18a and 18b, and in response, re-calculating the power demand requirements based on the loads to be operated.

In an embodiment related to the operation of loads on an aircraft, and more specifically to environmental control systems (ECS) employed on an aircraft, channel controllers 14a and 14b further receive information regarding the system state and/or flight phase. In some embodiments, depending on the system state and/or the flight phase of the aircraft, it may be desirable to reduce power to some loads to ensure adequate power is available for mission control systems during specified time periods (e.g., landing/take off). This ready redundancy ensures that if power is lost from an active channel, the backup channel is available to immediately provide power to critical loads.

At step 58, the active channel controller determines whether the power demand requirements can be satisfied by a single power bus. If the power demand requirements determined at step 56 cannot be met by a single power bus, then at step 66 the active channel controller determines whether other power buses are available to meet the determined power demand (discussed in more detail below). If the power demand requirements determined at step 56 can be met by a single power bus, then at step 60 the active channel controller determines whether it is desirable to employ more than one power bus to meet the power demand requirements of the plurality of loads 22a-22N. Depending on the application, it may be beneficial when possible to meet the power demands of the loads 22a-22N from a single power bus, rather than employ power from a plurality of power buses. For example, assuming channel controller 14a is the active channel controller, and power bus 12a is a utility power source (i.e., large capacity), power bus 12a can be used without power contribution by power bus 12b. In embodiments in which power bus 12b is sourced from a battery system, it may be desirable to attempt to meet all power demand requirements from power bus 12a, and only when the power demand cannot be met from power bus 12a to allocate power from other channels to the loads. In another embodiment, it is desirable to allocate power to the loads from all available power buses even in the event that one power bus would be sufficient to meet the power demand requirements of the attached loads. This provides load balancing that reduces the power drawn from each individual power bus.

If it is desirable to allocate power from more than one power bus, then at step 64 the active channel controller determines whether other power buses are available (discussed in more detail below). If load allocation between more than one power bus is not desirable, then at step 62 the active channel controller allocates power from the power bus associated with the active channel controller to the plurality of loads.

If the power demand requirements can be met by a single power bus and it is desirable to do so, then at step 62 the power allocation module associated with the active channel controller allocates power from power bus 12a to the loads. Because only a single power bus is employed, allocation of power provided at step 62 ensures that the rating of protective circuit 13a is not exceeded. At step 64, the determined allocation of power is communicated to each of the plurality of loads 22a-22N by power share arbitration logic 20a. As described with respect to FIG. 1, to provide power allocation (i.e., communicate to the loads the power bus from which they should draw power), power share arbitration logic 20a provides a communication signal to each of the respective loads 22a-22N. In this embodiment, because of the determination that the power demand requirements of the load can be met by a single power bus, the communication provided to the respective loads instructs them to draw power from power bus 12a. Similarly, in the embodiment shown in FIG. 2, microprocessor 36a provides a communication signal to each of loads 42a-42N to provide power allocation.

At step 60, if it is determined that the power demand requirements of the loads cannot be met by a single channel (e.g., power bus 12a) or that it is desirable to allocate power to the loads from more than one power bus, then at step 66 the power allocation module of the active channel controller 14a determines whether the power bus associated with the other channel(s) is available. Likewise, in embodiments in which it is desirable to provide load-sharing regardless of whether a single power bus is capable of meeting the power demand requirements, after evaluating the power demand requirements at step 56, the active channel controller 14a determines whether the other channel is available at step 66.

If no other channels are available (i.e., the status of the other power buses indicates they are unavailable for supplying power to a load), then at step 68 the active channel controller allocates power to the loads from the power bus associated with the active channel controller. In instances in which the power demand requirement is greater than the power bus capability of the available power bus, then the active channel controller schedules/interleaves the operation of the loads such that the power bus capability of the power bus is not exceeded. The terms 'schedule' and 'interleaved' refer broadly to selective activation of each of the plurality of loads. That is, the loads may be turned On and Off according to a schedule that determines the state (i.e., On or Off) of each load and the duration of each cycle. Likewise, the loads may be interleaved such that each load is turned On and Off for a fixed duration of non-overlapping time. Scheduling/interleaving of the loads (i.e., selectively providing power to the attached loads) by the active channel controller may be based on factors such as priority of each load and power requirements of each load. At step 70, the channel controller communicates the instructions to the attached loads such that they draw power from the power bus associated with the active channel controller according to the communicated instruction.

If at step 66, the active channel controller determines that other power buses are available, then at step 72 the power allocation module of the active channel controller selectively allocates power from the available power buses to the plurality of loads. The allocation of power determined by the active channel controller may be based on a number of factors, including the ratings of the circuit breakers/protective circuits associated with each power bus, various nominal, transient, and worst case power profiles of the connected loads, desired performance of the loads, operating conditions of the loads, and combinations thereof. At step 74, the active channel controller communicates instructions to the loads, dictating the power bus from which each of the loads should draw power. As described with respect to FIGS. 1 and 2, the determinations of which power bus each load should draw power may be made by the channel controller associated with the active channel controller, the power share arbitration logic associated with the active channel controller, or combinations thereof.

The present invention provides a load-sharing architecture that allows redundant controllers to allocate power to a plurality of loads from all available power sources, not just the power source with which the redundant controller is associated. The present invention therefore provides the desired redundancy while utilizing the full power capacity of the two or more available power sources.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A redundant, load-sharing system comprising:
a first power bus;
a second power bus;
a plurality of loads each connected to both the first power bus and the second power bus;
a first channel controller connected to receive power from the first power bus and connected to provide power allocation instructions to each of the plurality of loads; and a second channel controller redundant to the first channel controller and connected to receive power from the second power bus and connected to provide power allocation instructions to each of the plurality of loads, wherein one of the first and second channel controllers is designated as an active channel controller, the active channel controller providing power allocation instructions to each of the plurality of loads to allocate power from both the first power bus and the second power bus to the plurality of loads.

2. The redundant, load-sharing system of claim 1, wherein each of the plurality of loads includes a load setting register that stores power allocation instructions received from the active channel controller.

3. The redundant, load-sharing system of claim 1, wherein the first power bus and the second power bus each include a protective circuit defined by a trip threshold, wherein the active channel controller allocates power to the plurality of loads such that the power provided by the first power bus and the second power bus is less than the trip threshold of each protective circuit.

4. The redundant, load-sharing system of claim 3, wherein the protective circuit is a circuit breaker.

5. The redundant, load-sharing system of claim 3, wherein the active channel controller further allocates power to the plurality of loads based on nominal, transient, and worst case scenarios associated with each of the plurality of loads.

6. The redundant, load-sharing system of claim 1, wherein the first channel controller and the second channel controller include hardware for determining power allocation between the first power bus and the second power bus.

7. The redundant, load-sharing system of claim 1, wherein the first channel controller and the second channel controller each include a microprocessor for executing software stored on a computer readable medium for determining power allocation between the first power bus and the second power bus.

8. The redundant, load-sharing system of claim 1, wherein the active channel controller implements a reduced performance mode when either the first power bus or the second power bus becomes unavailable.

9. The redundant, load-sharing system of claim 1, wherein the plurality of loads are organized into power groups based in part on the expected power drawn by each of the plurality of loads.

* * * * *